United States Patent
Wang et al.

(10) Patent No.: US 11,239,923 B2
(45) Date of Patent: Feb. 1, 2022

(54) APPARATUS AND METHOD FOR TRANSMISSION SYSTEM

(71) Applicant: Telefonaktiebolaget LM Ericsson (publ), Stockholm (SE)

(72) Inventors: Zhancang Wang, Beijing (CN); Chen He, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/049,365

(22) PCT Filed: Apr. 25, 2018

(86) PCT No.: PCT/CN2018/084384
§ 371 (c)(1),
(2) Date: Oct. 21, 2020

(87) PCT Pub. No.: WO2019/205003
PCT Pub. Date: Oct. 31, 2019

(65) Prior Publication Data
US 2021/0250105 A1    Aug. 12, 2021

(51) Int. Cl.
*H04B 17/10* (2015.01)
(52) U.S. Cl.
CPC .................................. *H04B 17/101* (2015.01)
(58) Field of Classification Search
CPC .................................................... H04B 17/101
See application file for complete search history.

(56) References Cited

U.S. PATENT DOCUMENTS

| 7,865,145 | B2 | 1/2011 | Neustadt et al. |
| 9,482,705 | B2 | 11/2016 | Hind |
| 9,560,541 | B2 | 1/2017 | Mochizuki |
| 2014/0050114 | A1 | 2/2014 | Gao et al. |

(Continued)

FOREIGN PATENT DOCUMENTS

| CN | 101146314 A | 3/2008 |
| CN | 104756420 A | 7/2015 |

OTHER PUBLICATIONS

International Search Report and the Written Opinion of the International Searching Authority, issued in corresponding International Application No. PCT/CN2018/084384, dated Jan. 9, 2019, 10 pages.

*Primary Examiner* — Hsinchun Liao
(74) *Attorney, Agent, or Firm* — Rothwell, Figg, Ernst & Manbeck, P.C.

(57) ABSTRACT

An apparatus and a method for transmission system are disclosed. According to an embodiment, a voltage standing wave ratio (VSWR) detection apparatus, comprising: a signal processing circuit with 1-bit analog-to-digital converter (ADC) functionality configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital pulse train and output the digital pulse train to a digital interface of a processing device or unit.

20 Claims, 15 Drawing Sheets

(56) References Cited

U.S. PATENT DOCUMENTS

2015/0123828 A1* 5/2015 Alldred ................ H03M 3/442
  341/143
2017/0310405 A1 10/2017 Barabash et al.
2018/0138918 A1* 5/2018 Patil ...................... H03M 1/001

* cited by examiner

APPARATUS AND METHOD FOR TRANSMISSION SYSTEM

CROSS REFERENCE TO RELATED APPLICATION(S)

This application is a 35 U.S.C. § 371 National Phase Entry Application from PCT/CN2018/084384, filed Apr. 25, 2018, designating the United States, the disclosure of which is incorporated herein by reference in its entirety.

TECHNICAL FIELD

Embodiments of the disclosure generally relate to radio technologies, and, more particularly, to an apparatus and a method for transmission system.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

In a wireless system, a transmitter is coupled to an antenna through a cable/connector system. Assuming an ideal transmission system, there will be no power reflected back from a load such as the antenna. That is, a transmission power in a "forward" signal is all applied through the cable/connector system to the antenna. Real transmission systems, however, have reflections due to, e.g., impedance mismatch somewhere in the cable/connector system or antenna. Wireless or cellular communication service providers or carriers can share an infrastructure such as feeding networks, antennas and the like at common sites. Accordingly, multiple wireless or cellular base stations each owned and maintained by different carriers can be served by the shared infrastructure. The shared infrastructure can be owned and maintained by one of the service providers or carriers or by a third party. The infrastructure owner may have no control over the power that may be applied by a carrier to the infrastructure owner's feeding networks and antennas. If a problem develops, the infrastructure owner may not be able to adjust a power level or turn off the power from a transmitter because of contractual requirements or for other reasons.

Additionally, a forward radio frequency (RF) power, a reflected RF power and a voltage standing wave ratio (VSWR) functions built into many wireless systems may not be able to properly sense, calculate and control operation of the base station when these wireless systems are connected to the shared infrastructure because of insertion loss or the like. An impedance mismatch between a RF feed from a transmitter and an infrastructure equipment may be masked by the insertion loss of the infrastructure equipment which may render a VSWR alarm circuit of the wireless system ineffective. The insertion loss may cause the return loss measured by the wireless system to be lower than actuality, which may cause miscalculation of the VSWR and an inability of the wireless system to effectively sense defects in an air interface and to adjust its operating parameters accordingly and generate an alarm.

Wireless or cellular communication service providers or carriers need a way to monitor a condition of the antenna and its cable/connector system. A common indicator of this condition is the VSWR although there are many other equivalents including a reflection coefficient and the return loss. The return loss is a ratio of the forward (incident) power and the reflected power, converted to decibel (dB). A directional coupler, a bridge or a circulator may be used to separate the forward and reflected coupling signals and a detector may be used to quantify their respective amplitudes. While the forward coupled signal tends to be quite pure, the reverse coupled signal is returned from the antenna and may be accompanied by extraneous energy, which is "noise" insofar as a measurement is concerned.

This "noise" may be due to various factors such as other transmitters electrically combined with the desired transceiver or from co-sited transmitters coupling in through the antennas. Either way, a detector for detected the reflected power will report more power than the reflection itself is producing, which may result in a lower return loss and then cause a false alarm. For example, recent advances in complex modulations with a significant time domain component, multiple carriers and especially co-siting can make the task of monitoring the condition of the antenna and its cable/connector system more difficult than in the past.

Accurate measurement of the transmit power from the wireless system can also be important for various reasons, such as to prevent damage to equipment, electromagnetic interference (EMI) and the like. However, readings of the transmit power at the wireless system can also be erroneous because of high antenna cable loss and some of the same factors that affect VSWR.

However some existing solutions such as U.S. Pat. Nos. 7,865,145B2, 9,482,705B2, 9,560,541 and US20170310405 may have some problems which will be discussed thereafter. Therefore it would be beneficial to provide an improved solution for VSWR.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, a VSWR detection apparatus is presented. The VSWR detection apparatus may comprise a signal processing circuit with 1-bit analog-to-digital converter (ADC) functionality. The signal processing circuit may be configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital pulse train and output the digital pulse train to a digital interface of a processing device or unit.

In an embodiment of the disclosure, the signal processing circuit may comprise a first radio frequency logarithmic detector configured to detect the forward coupled signal; and a second radio frequency logarithmic detector configured to detect the reverse coupled signal.

In an embodiment of the disclosure, the signal processing circuit may comprise an operational amplifier configured to convert the forward detected signal and the reverse detected signal to the analog voltage signal.

In an embodiment of the disclosure, the 1-bit ADC comprises an 1-bit Sigma Delta ADC.

In an embodiment of the disclosure, the signal processing circuit comprises an interface and signal conditioning circuit configured to adapt the digital pulse train to the digital interface of the processing device or unit.

In an embodiment of the disclosure, the interface and signal conditioning circuit comprises a voltage controlled current source circuit configured to convert the digital pulse train to a train of current pulses changing from a first low current value to a second high current value and output the train of current pulses to the digital interface of the processing device or unit.

In an embodiment of the disclosure, the VSWR detection apparatus may comprise a temperature compensation circuit.

In an embodiment of the disclosure, the VSWR detection apparatus may comprise a sampling coupler connected with the signal processing circuit and configured to obtain the forward coupled signal and the reverse coupled signal in the transmission line of the antenna system and output the forward coupled signal and the reverse coupled signal to the signal processing circuit.

In an embodiment of the disclosure, the sampling coupler comprises one of a directional coupler, a bridge and a circulator.

In an embodiment of the disclosure, the digital interface comprises a General-Purpose Input-Output (GPIO) interface.

According to another aspect of the disclosure, it is provided a VSWR measure apparatus. The VSWR measure apparatus may comprise a digital interface configured to receive a digital pulse train output by the VSWR detection apparatus according to the above aspect; and a processing unit configured to count a total number of the digital pulse train in a predefined timing window and perform, based on the total number of the digital pulse train, at least one of determining the VSWR, determining a state of the antenna system and triggering a standing wave condition alarm.

In an embodiment of the disclosure, the processing unit is configured to determine the VSWR based on the total number of the digital pulse train in the predefined timing window by using a VSWR output transfer function or a linear interpolation, wherein a corresponding relationship between a specific pulse number count and a specific VSWR has been learned.

In an embodiment of the disclosure, the processing unit is configured to compare the total number of the digital pulse train in the predefined timing window with a first threshold value and trigger a standing wave condition alarm when the total number of the digital pulse train is greater than the first threshold value.

In an embodiment of the disclosure, a pulse number count corresponding to the VSWR of 2.5 is set as the first threshold value.

In an embodiment of the disclosure, the processing unit is further configured to compare the total number of the digital pulse train in the predefined timing window with a plurality of second threshold values and determine the state of the antenna system based on the comparison result.

In an embodiment of the disclosure, the digital interface comprises a General-Purpose Input-Output (GPIO).

In an embodiment of the disclosure, the processing unit is configured to report the VSWR to a transmission management unit.

According to another aspect of the disclosure, it is provided a VSWR determination apparatus. The VSWR determination apparatus may comprise at least one VSWR detection apparatus according to the above aspect and a VSWR measure apparatus according to the above aspect.

According to another aspect of the disclosure, it is provided a radio device. The radio device may comprise an antenna system and the VSWR determination apparatus according to the above aspect.

According to another aspect of the disclosure, it is provided a method implemented at a voltage standing wave ratio (VSWR) detection apparatus with 1-bit analog-to-digital converter (ADC) functionality. The method may comprise receiving a forward coupled signal in a transmission line of an antenna system; receiving a reverse coupled signal in the transmission line of the antenna system; detecting the forward coupled signal and the reverse coupled signal; converting the forward detected signal and the reverse detected signal to an analog voltage signal mapped to a return loss value; converting by the 1-bit ADC the analog voltage signal into a digital pulse train; and outputting the digital pulse train to a digital interface of a processing device or unit.

In an embodiment of the disclosure, detecting the forward coupled signal and the reverse coupled signal may comprise detecting the forward coupled signal by a first radio frequency logarithmic detector; and detecting the reverse coupled signal by a second radio frequency logarithmic detector.

In an embodiment of the disclosure, converting the forward detected signal and the reverse detected signal to an analog voltage signal mapped to a return loss value may comprise converting the forward detected signal and the reverse detected signal to the analog voltage signal by an operational amplifier.

In an embodiment of the disclosure, the 1-bit ADC comprises an 1-bit Sigma Delta ADC.

In an embodiment of the disclosure, the method may further comprise adapting the digital pulse train to the digital interface of the processing device or unit.

In an embodiment of the disclosure, adapting the digital pulse train to the digital interface of the processing device or unit may comprise converting the digital pulse train to a train of current pulses changing from a first low current value to a second high current value and outputting the train of current pulses to the digital interface of the processing device or unit.

In an embodiment of the disclosure, the method may further comprise performing temperature compensation.

In an embodiment of the disclosure, the digital interface comprises a General-Purpose input-Output interface.

In an embodiment of the disclosure, the forward coupled signal and the reverse coupled signal are received from a sampling coupler.

According to another aspect of the disclosure, it is provided a method implemented at implemented at a VSWR measure apparatus. The method may comprise receiving by a digital interface a digital pulse train output by a VSWR detection apparatus according to the above aspect; counting a total number of the digital pulse train in a predefined timing window; and performing, based on the total number of the digital pulse train, at least one of determining the VSWR, determining a state of the antenna system and triggering a standing wave condition alarm.

In an embodiment of the disclosure, determining the VSWR comprises determining the VSWR based on the total number of the digital pulse train in the predefined timing window by using a VSWR output transfer function or a linear interpolation, wherein a corresponding relationship between a specific pulse number count and a specific VSWR has been learned.

In an embodiment of the disclosure, triggering a standing wave condition alarm comprises comparing the total number of the digital pulse train in the predefined timing window with a first threshold value; and triggering a standing wave condition alarm when the total number of the digital pulse train is greater than the first threshold value.

In an embodiment of the disclosure, a pulse number count corresponding to the VSWR of 2.5 is set as the first threshold value.

In an embodiment of the disclosure, determining a state of the antenna system comprising comparing the total number of the digital pulse train in the predefined timing window with a plurality of second threshold values; and determining the state of the antenna system based on the comparison result.

In an embodiment of the disclosure, the digital interface comprises a General-Purpose Input-Output.

In an embodiment of the disclosure, the method may further comprise reporting the VSWR to a transmission management unit.

According to another aspect of the disclosure, it is provided a method at a VSWR determination apparatus. The method may comprise the steps performed by the VSWR detection apparatus and the VSWR measure apparatus according to the above aspect.

According to another aspect of the disclosure, it is provided a computer program product comprising instructions which when executed by at least one processor, cause the at least one processor to perform the method according to the above aspect.

These and other objects, features and advantages of the disclosure will become apparent from the following detailed description of illustrative embodiments thereof, which are to be read in connection with the accompanying drawings.

DETAILED DESCRIPTION

Figure 1:
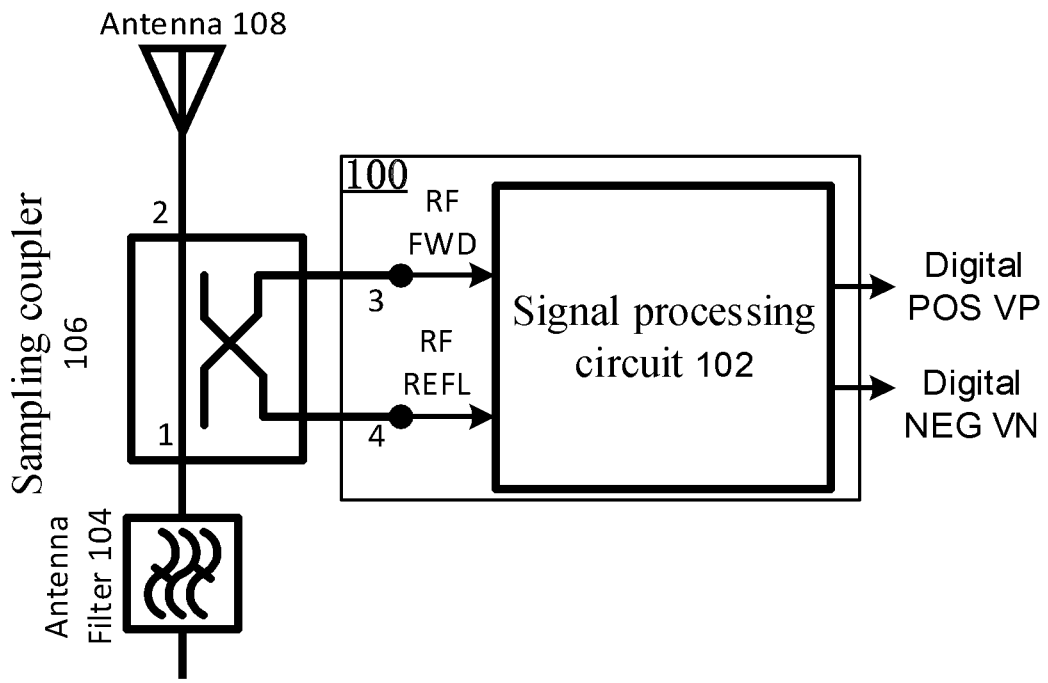
FIG. 1 is a schematic block diagram of a VSWR detection apparatus according to an embodiment of the disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless network/system" refers to a network following any suitable radio standards such as communication standards, broadcast standards. The communication standards may comprise but not limited to LTE-Advanced (LTE-A), LTE, Wideband Code Division Multiple Access (WCDMA), High-Speed Packet Access (HSPA), and so on. Furthermore, the communications between a terminal device and a network device in the wireless network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols such as NR, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless network via which a terminal device accesses the network and receives services therefrom. The network device refers to a base station (BS), an access point (AP), or any other suitable device in the wireless network. The BS may be, for example, a node B (NodeB or NB), an evolved NodeB (eNodeB or eNB), or gNB, a Remote Radio Unit (RRU), a radio header (RH), a remote radio head (RRH), a relay and so forth. More generally, however, the network device may represent any suitable device (or group of devices) capable, configured, arranged, and/or operable to enable and/or provide a terminal device access to the wireless network or to provide some service to a terminal device that has accessed the wireless network.

Additionally, as used herein, the term 'circuit' refers to (a) hardware-only circuit implementations (e.g., implementations in analog circuit and/or digital circuit); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuit' applies to all uses of this term herein, including in any claims. As a further example, as used herein, the term 'circuit' also includes an implementation comprising one or more processors and/or portion(s) thereof and accompanying software and/or firmware.

The term "processing device or unit" includes but not limited to, CPU (Central Processing Unit), SOC (System on Chip), MCU (microcontroller unit), ASIC (Application Specific Integrated Circuit), PACC (Power Amplifier Control Chipset), FPGA (Field Programmable Gate Array), server, desktop computer, laptop computer, cloud computer, Internet/network node, communicator, a processing module of a communication system/device, etc. In at least one example embodiment, the processing device or unit may comprise processor and memory. The processor may utilize computer program code to cause an apparatus to perform one or more actions described herein. Memory may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory may store any of a number of pieces of information, and data. The information and data may be used by the apparatus to implement one or more functions of the apparatus, such as the functions described herein. In at least one example embodiment, memory includes computer program code such that the memory and the computer program code are configured to, working with the processor, cause the apparatus to perform one or more actions described herein.

The term "digital interface" refers to a digital interface that can transmit a digital pulse train, including but not limited to, General-Purpose Input-Output (GPIO) interface, etc.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the turns "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In order to monitor a working state of the wireless device/system such as a base station, in addition to detecting a state of the transmitter of the wireless device/system, it is necessary to monitor an antenna connection, and an effective method is to detect VSWR at an entrance of the antenna feeder. In theory, the standing wave is formed after a traveling wave superposition in an opposite direction, and the value of VSWR is the ratio of the maximum voltage to the minimum voltage in the standing wave. Also, another parameter relate to VSWR is the return loss.

In U.S. Pat. No. 7,865,145B2, there is disclosed a VSWR measurement device which comprises a RF switch and a unit for converting a signal received from the RF switch into a digital base band. A digitized code division multiple access (CDMA) signal is fed into means for extracting a pilot signal from the CDMA signal. Furthermore, the device includes a timing unit, a code generator associated with said extraction means, and a controller.

In U.S. Pat. No. 9,482,705B2, there is disclosed a measurement circuit for measuring the VSWR in a wideband communication system. The time-domain measurement signals for a forward wave and a reflected wave are converted to a frequency domain. Reflection coefficients are then computed for a plurality of frequency components in the measurement signals. The reflection coefficients are used to compute interference detection metrics for one or more of said frequency components in the measurement signals. Frequency components in the forward wave, the reflected wave, or both, may be discarded based on the interference detection metrics, and the remaining frequency components in the forward and reflected waves are used to compute the VSWR In U.S. Pat. No. 9,560,541, there is disclosed a VSWR determining means including a baseband signal analyzing means which analyze a baseband signal by detecting a difference between the baseband signal, and a delay signal of the baseband signal; a baseband signal density determining means which determine a density of the baseband signal, based on the difference between the baseband signal and the delay signal analyzed by the baseband signal analyzing means, and a VSWR output switching means which restrain output of the VSWR measuring means, when the baseband signal density determining means determine that the density of the baseband signal is low.

In US20170310405, there is disclosed a method comprising measuring values of a radio frequency signal that comprises a forward coupled signal and a reflected version of the forward coupled signal in a cable/connector system; inputting the measured values into a VSWR apparatus; mathematically rotate in phase, in the VSWR apparatus, a complex form of a transmitted signal; sampling a single axis of the transmitted signal; comparing the sample against a single axis reverse coupled signal; applying the rotation over equally spaced intervals spanning one complete cycle; taking an absolute value of each return loss ratio; determining the mean of the absolute values; associating the mean value with a return loss of the cable/connector system; and sending the mean value from the VSWR apparatus to an alarm actuator and activating the alarm based on the mean value in relation to a threshold.

The problems of the above existing solutions may comprise:
- Most existing solutions use RF or IF (intermediate frequency) signal transmission for VSWR indication, which may be interfered by the noise and interference on a signal path.
- Some existing solutions use a base band digital signal processing, e.g. FFT (Fast Fourier transform), which may consume much hardware computing resources and power resources. This may be worse when multiple antennas are used, e.g. massive MIMO (multiple-input and multiple-output) application scenario.
- Multi-bit ADC (analog-to-digital converter) is used, which may complex the design and reduce a robustness of VSWR detection.
- Down conversion is used from RF to IF, which is complex and high cost due to a couple of components are used in the detection path.
- Digital temperature compensation look-up table (LUT) is used for calibration.

To overcome or mitigate at least one of the above-mentioned problems or other problems, the present disclosure proposes a method and apparatus for VSWR. The method of the disclosure may comprise: obtaining a forward coupled signal and a reverse coupled signal through a sampling coupler such as an antenna interface board (AIB) sampling coupler and then carrying out sampling signal processing as below: the forward and reverse coupled signals may be detected through a first RF logarithmic detector and a second RF logarithmic detector respectively; two detected analog voltage signals may be injected into an operational amplifier by performing a subtraction operation and amplification which can output a voltage value corresponding to the return loss; this voltage signal is then input into a 1-bit-output ADC such as a Sigma Delta ADC which outputs a digital pulse train through an interface and signal conditioning circuit to a digital interface such as GPIO that is connected with a processing device or unit such as CPU/ASIC/MCU/PACC, the digitized return loss value could be read from its relevant registers, and according to a number of pulse count, a variation of standing wave loss can be mapped and calculated. The method may further comprise comparing the obtained value with a predetermined threshold value, and the comparison result may trigger a real-time standing wave condition alarm or not. The method of the disclosure may eliminate a problem of system error in the VSWR detection, which can be applied to different systems and different environments, has a high anti-interference ability, and a detection precision of the standing wave ratio is greatly improved.

By way of a brief and non-limiting introduction, the method for VSWR in a wireless communication system may comprise:

The forward coupled signal and the reverse coupled signal are obtained from a transmission path/line between a transmitter and an antenna by a sampling coupler.

Through two RF logarithmic detectors, the forward coupled signal and the reverse/reflected coupling signal are converted into the forward detected signal and the reverse detected signal respectively. An operational amplifier converts the forward detected signal and the reverse detected signal to a corresponding return loss analog signal due to one by one correspondence between the return loss and the VSWR value based on below equation (1).

$$RL=20*\log 10(abs((1+VSWR)/(1-VSWR))) \text{ in dB unit.} \quad (1)$$

Where RL denotes the return loss, abs denotes an absolute value sign.

The obtained return loss analog signal is injected into a 1-bit-output ADC such as Sigma Delta ADC. The 1-bit-output ADC outputs a pulse sequence through an interface and signal conditioning circuit (such as a voltage controlled current source circuit) to be transmitted in digital form of the return loss information, the digitized return loss value could be read in a proper timing window, and according to the number of pulse count, the variation of standing wave loss can be mapped and calculated.

The digitized return loss pulse train is transmitted over a trace/cable to the connection of GPIOs of a process device or unit such as CPU, SOC, ASIC and PACC. By controlling the timing window, the number of pulse count may be counted by the process device and the number of pulse count may be stored in a register. Then the number of pulse count may be compared with a predetermined threshold value, and the result may trigger a real-time standing wave condition alarm or not.

The real-time VSWR from the process device may be reported to a transmission management unit of a wireless device.

According to equation (1), there is one by one correspondence between the VSWR and the return loss. Therefore, it is feasible to convert the VSWR detection task into return loss detection due to this solid mapping relationship in equation (1).

The schematic relationship among the VSWR value, the return loss value and the pulse number count could be illustrated in Table 1 as a pulse count to VSWR LUT.

TABLE 1

| VSWR Value | Return Loss Value (dB) | Pulse Number Count |
|---|---|---|
| 1.0 | INF | 182 +/− 5.0% |
| 1.25 | 19.1 | 495 +/− 1.6% |
| 1.5 | 14.0 | 809 +/− 1.0% |
| 1.75 | 11.3 | 1126 +/− 0.7% |
| 2.0 | 9.5 | 1444 +/− 0.6% |
| 2.25 | 8.3 | 1762 +/− 0.5% |
| 2.5 | 7.4 | 2085 +/− 0.4% |
| 2.75 | 6.6 | 2408 +/− 0.4% |
| 3 | 6 | 2732 +/− 0.4% |

The method of the disclosure may be based on the above principle. It is noted that though the embodiments are mainly described in the context of the antenna system of a cellular system, they are not limited to this hut can be applied to any suitable wireless system comprising the antenna system.

Now some exemplary embodiments of the present disclosure will be described below with reference to the figures.

FIG. 1 is a schematic block diagram of a VSWR detection apparatus according to an embodiment of the disclosure. As shown in FIG. 1, the VSWR detection apparatus 100 may comprise a signal processing circuit 102 with 1-bit ADC functionality. The signal processing circuit 102 may receive a forward coupled signal in a transmission line of an antenna system and receive a reverse coupled signal in the transmission line of the antenna system from a sampling coupler 106 such as an AIB coupler. The sampling coupler 106 may comprise one of a directional coupler, a bridge and a circulator and may be arranged between an output end of an antenna filter 104 and an input end of an antenna feeder in a transmitter of the antenna system. An output signal of the antenna filter 104 is input in the sampling coupler's Port 1, and three signals are output after the sampling coupler 106. The first signal is the forward coupled signal which is output through Port 3 as a first input signal of the signal processing circuit 102. The second signal is the reverse coupled signal which goes through PORT 4 as a second input signal of the signal processing circuit 102. The first and second signals are used as the input signals of the signal processing circuit 102. The third signal is a power output signal which is transmitted via the Port 2 to the antenna 108. With the RF signal as input signals at Port 3 and Port 4, the signal processing circuit 102 may output positive pulse signals, Digital POS VP, and negative pulse signals, Digital NEG VN. By counting the number of pulse signals in a certain time, the VSWR value can be obtained according to the pulse number count to VSWR LUT as shown in Table 1.

In this embodiment, the signal processing circuit 102 may be configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital pulse train and output the digital pulse train to a digital interface of a processing device or unit. The above functionalities may be implemented by using any suitable circuits.

Figure 2:
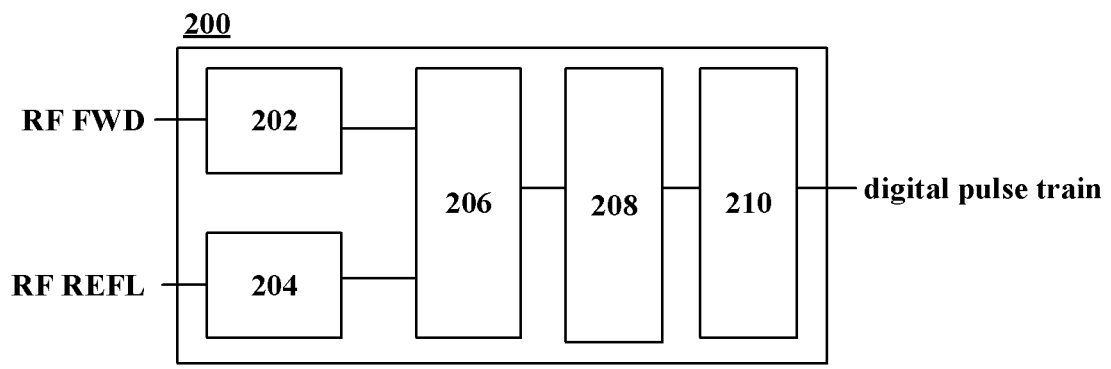
FIG. 2 is a schematic block diagram of the signal processing circuit according to an embodiment of the disclosure.

FIG. 2 is a schematic block diagram of the signal processing circuit according to an embodiment of the disclosure. The signal processing circuit 200 may comprise a first detection circuit 202 for detecting the forward coupled signal and a second detection circuit 204 for detecting the reverse coupled signal. For example, the first and second detection circuits may be implemented by a detector such as a RF logarithmic detector. The output of the first and second detection circuits 202, 204 may be analog voltage signals which may be injected into an operational circuit 204.

The operational circuit 204 such as an operational amplifier may convert the forward detected signal and the reverse detected signal to the analog voltage signal mapped to the return loss value. For example, the operational circuit may perform a subtraction operation on the forward detected signal and the reverse detected signal and amplification, and output the analog voltage value mapped to the return loss to an 1-bit ADC 206.

The 1-bit ADC 206 may convert the analog voltage signal into a digital pulse train and output the digital pulse train to an interface and signal conditioning circuit 208. The 1-bit ADC may comprise an 1-bit Sigma Delta ADC or any other suitable 1-bit output ADC.

The interface and signal conditioning circuit 208 may adapt the digital pulse train to the digital interface of the processing device or unit. In an embodiment, the interface and signal conditioning circuit 210 may comprise a voltage controlled current source circuit configured to convert the digital pulse train to a train of current pulses changing from a first low current to a second high current value and output the train of current pulses to the digital interface of the processing device or unit. The digital interface may comprise a General-Purpose Input-Output (GPIO) interface or any other suitable digital interface.

Figure 3:
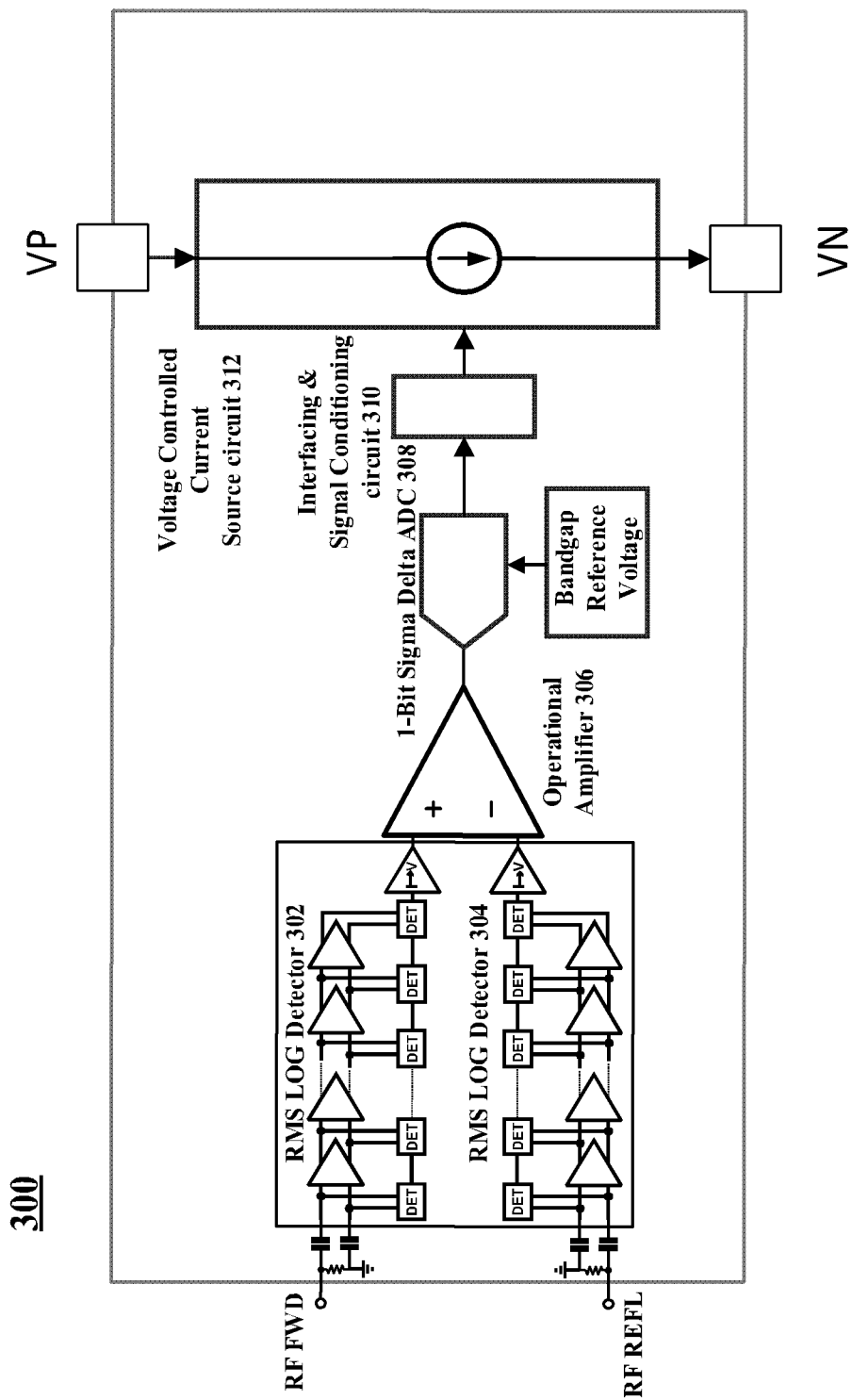
FIG. 3 is a schematic block diagram of a signal processing circuit 300 according to another embodiment of the disclosure.

FIG. 3 is a schematic block diagram of a signal processing circuit 300 according to another embodiment of the disclosure. As shown in FIG. 3, the signal processing circuit 300 comprises two RF root mean squared (RMS) log detectors 302, 304, an operational amplifier 306, a 1-bit Sigma Delta ADC 308 with bandgap reference voltage, an interface and signal conditioning circuit 310 and a voltage controlled current source 312. The RF RMS Log detectors 302, 304 may use multistage diodes and log amplifiers cascade as an analog circuit to detect both forward and reverse coupled signals and convert them into the forward detected signal and the reverse detected signal, such as analog voltages. The forward detected signal and the reverse detected signal are input into the operational amplifier 306 which converts them to the analog voltage signal mapped to the return loss value. Then the analog voltage signal is applied to an input of the 1-bit Sigma Delta ADC 308 that is driven by the internal bandgap reference voltage, which guarantees full temperature range reference voltage stability. The 1-bit Sigma Delta ADC 308 converts the analog voltage signal into a digital pulse train. The output of the 1-bit Sigma Delta ADC 308 is then processed through the interface and conditioning circuit 310 into a digital pulse train. The digital pulse train is then converted to a current pulse train by the output voltage controlled current source circuit 312 that includes high and low current regulators. The voltage applied across the signal processing circuit 300 is regulated by an internal voltage regulator to provide a consistent VDD from VP that is used by the 1-bit Sigma Delta ADC 308 and its associated circuit.

Figure 4:
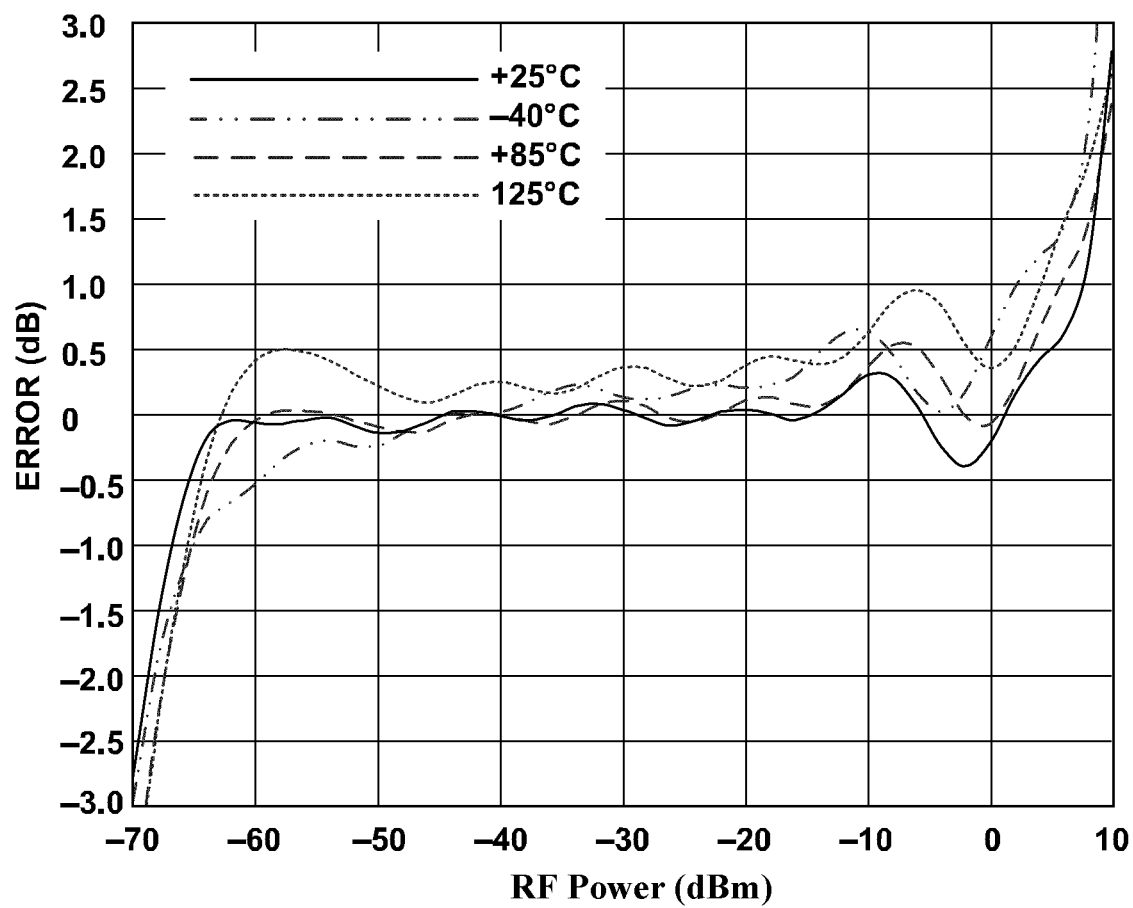
FIG. 4 illustrates a graph of VSWR detection error versus RF input power in dBm when the VSWR detection apparatus works under different temperatures according to an embodiment of the disclosure.

FIG. 4 illustrates a graph of VSWR detection error versus RE input power in dBm when the VSWR detection apparatus works under different temperatures according to an embodiment of the disclosure. In this embodiment, the VSWR detection apparatus works at 2700 MHz for RF power detection, which provides a +/− 3 dB dynamic range of 80 dB and a sensitivity reaches −70 dBm. As shown in FIG. 4, the VSWR detection error becomes large when the temperature increases.

Figure 5:
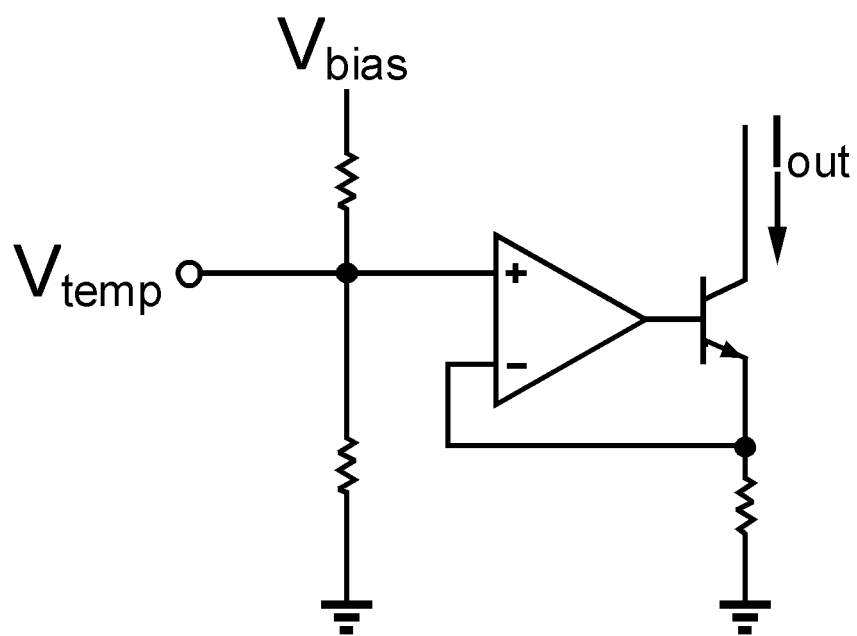
FIG. 5 illustrates a temperature compensation circuit according to an embodiment of the disclosure.

Over a wide temperature range, an embodiment of the present disclosure provides an optimization scheme of internal temperature compensation at a given frequency. In this embodiment, the VSWR detection apparatus may comprise a temperature compensation circuit 600 as shown in FIG. 5. The temperature compensation circuit 600 may be applied to the interface and signal conditioning circuit or any other suitable circuit. The temperature compensation circuit 600 may provide internal temperature compensation at a given frequency. As shown in FIG. 5, $V_{temp}$ is a voltage forced between an operational amplifier's positive input and a ground. The value of this voltage determines a magnitude of an analog correction coefficient, which is used to reduce intercept drift.

The relationship between an output temperature drift and a frequency is not linear and cannot be easily modeled. As a result, at least one experiment is required to select the optimum $V_{temp}$ voltage. Compensating the VSWR for temperature drift using $V_{temp}$ tuning allows for great flexibility. If it requires minimum temperature drift at a given input power or subset of a dynamic range, the $V_{temp}$ voltage can be swept while monitoring analog output voltage over temperature.

Figure 6:
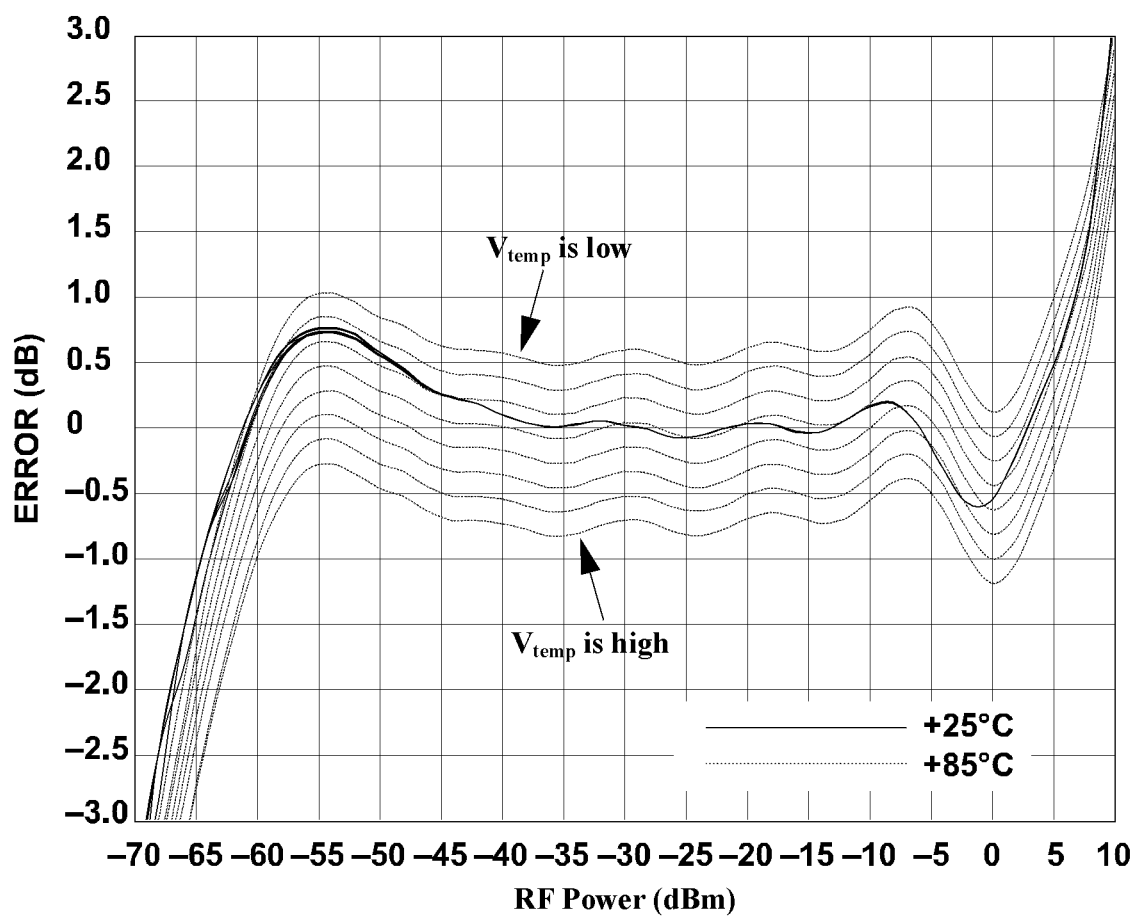
FIG. 6 illustrates a graph of how error changes on a typical part over a full dynamic range according to an embodiment of the disclosure.

FIG. 6 illustrates how error changes on a typical part over a full dynamic range when $V_{temp}$ is swept in a proper range. As shown in FIG. 6, if the VSWR is required to have minimum error at a certain temperature, then $V_{temp}$ may be chosen such that a line for that temperature intersects a 25° C. line. At this $V_{temp}$ setting, the error at all other temperatures is not the minimum. If a deviation of error over the temperature is more important than the error at a single temperature, $V_{temp}$ may be determined by an intersection of the lines for the temperatures of interest. For the characterization data presented in FIG. 6, $V_{temp}$ values may be chosen so that VSWR detection apparatus has a minimum error at 85° C., which is at the intersection of the lines for 85° C. and 25° C. If a given application requires error deviation to be at a minimum when the temperature changes from −40° C. to 85° C., $V_{temp}$ may be determined by the intersection of the error line for those temperatures. Also it is important that temperature adjustment may be performed on multiple devices when it is used in massive MIMO application scenarios.

Figure 7:
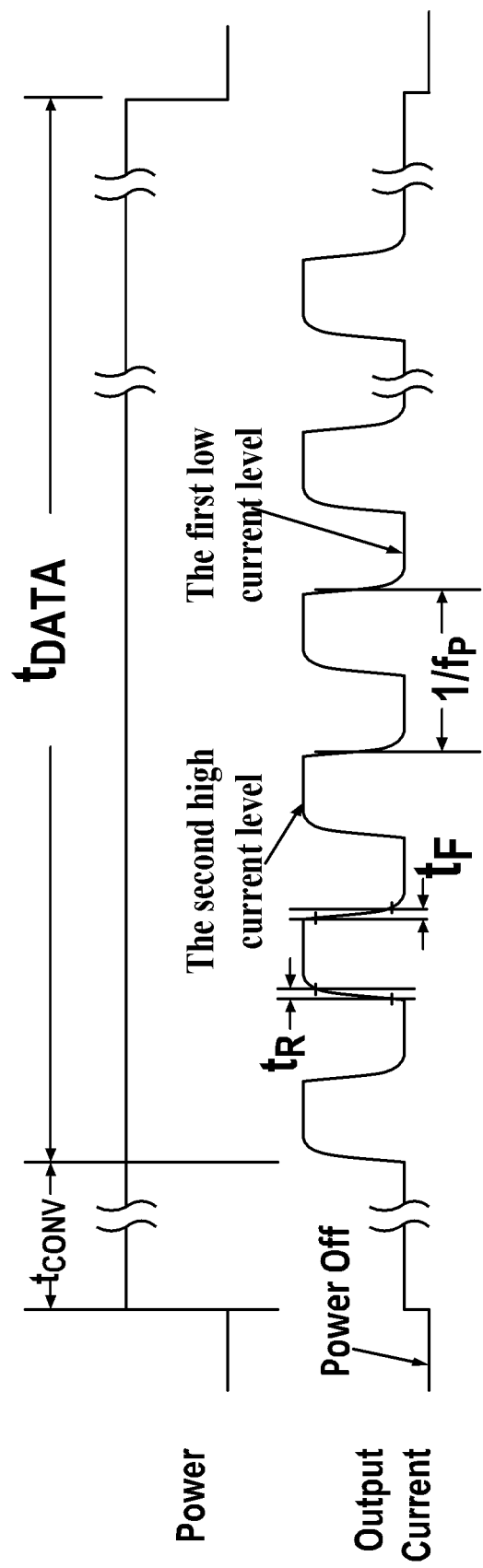
FIG. 7 schematically shows a timing waveform of the VSWR pulse train transmission according to an embodiment of the disclosure.

FIG. 7 schematically shows a timing waveform of the VSWR pulse train transmission according to an embodiment of the disclosure. As shown in FIG. 7, $t_R$, $t_F$ denote output current rise and fall time, which determine whether the pulse transmission quality is acceptable or not; $f_P$ denotes the output current pulse frequency, which is a fixed frequency based on a design; $t_{CONV}$ denotes conversion time, which includes a power up time or a device turn on time. $t_{DATA}$ is a data transmission time.

Figure 8:
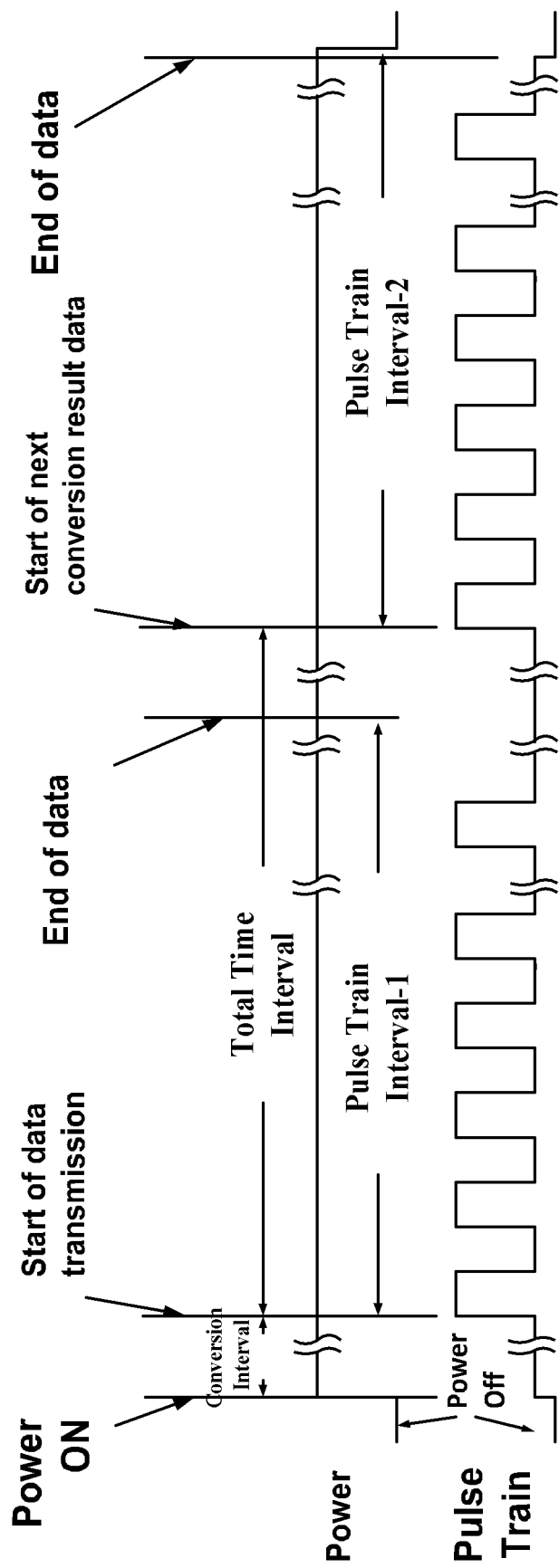
FIG. 8 schematically shows VSWR to digital pulse train timing cycle according to an embodiment of the disclosure.

FIG. 8 schematically shows VSWR to digital pulse train timing cycle according to an embodiment of the disclosure. As shown in FIG. 8, the VSWR detection apparatus provides a digital output in the form of a pulse count that is transmitted by a train of current pulses. After the VSWR detection apparatus is powered up, it may transmit a very low current level for a short conversion interval while the part executes an initial VSWR to digital conversion. Once the initial VSWR to digital conversion has completed, the VSWR detection apparatus may start to transmit a pulse train that toggles from the low current of low current level to the high current of high current level. The pulse train total time interval is illustrated in FIG. 8. The VSWR detection apparatus may transmit a series of pulses equivalent to the pulse count at a given VSWR as described in the above Table 1. After the pulse count has been transmitted, the VSWR detection apparatus's output current level may remain low for the remainder of the same as conversion interval value. The total time interval for the VSWR to digital conversion and the pulse train time interval are shown in the FIG. 8. If the power is continuously applied, the pulse train output will repeat start every total time interval. The VSWR detection apparatus can be powered down at any time, thus conserving system power. However, a power down wait time of conversion interval may happen which may be used before the device is turned on again.

The VSWR detection apparatus may output at minimum 1 pulse and a theoretical maximum $2^N$ pulses, which N is defined in the 1-bit ADC's design. Each pulse has a weight of (Effective Range VSWR/$2^N$). Here Effective range VSWR ($ER_{VSWR}$) is a valid range of VSWR detection and alarm purpose. An initial pulse count corresponds to a VSWR of 1, while a pulse count of $2^N$ corresponds to a VSWR much greater than 1. Note that the VSWR detection apparatus is only ensured to operate within the Effective VSWR range. Exceeding this Effective VSWR range, the accuracy of the VSWR detection apparatus degrades because it is upper limit for acceptable VSWR range used in practical scenarios.

Figure 9:
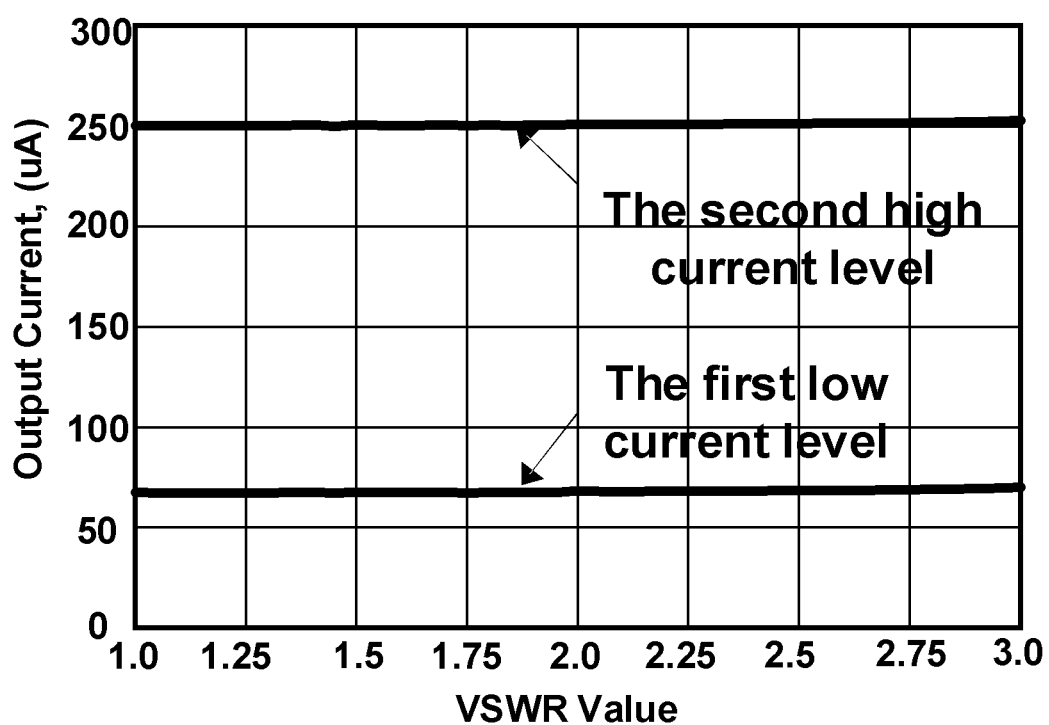
FIG. 9 illustrates a graph of output current of the VSWR detection apparatus versus VSWR value according to an embodiment of the disclosure.

FIG. 9 illustrates a graph of output current of the VSWR detection apparatus versus VSWR value according to an embodiment of the disclosure. As shown in FIG. 9, the output of the VSWR detection apparatus may be transmitted over a single wire using a train of current pulses that typically change from a low current to a high current value. A simple resistor can then be used to convert the current pulses to a voltage. With a shunt resistor, the output voltage levels range in proper levels can be received by the processing device or unit properly. All necessary peripheral circuitry can be used to convert this signal to valid logic levels that the processing device or unit can process properly. The VSWR value can be determined by gating a simple counter on for a specific time interval to count the total number of output pulses. After power is first applied to the VSWR detection apparatus, the current level will remain below the first low current value for a short interval so that the VSWR detection apparatus determines an initial VSWR value. Once the initial VSWR value is determined, the pulse train will begin. The individual pulse frequency is a predetermined and fixed value. The VSWR detection apparatus may continuously convert and transmit data when the power is applied approximately every predefined and fixed interval.

Figure 10:
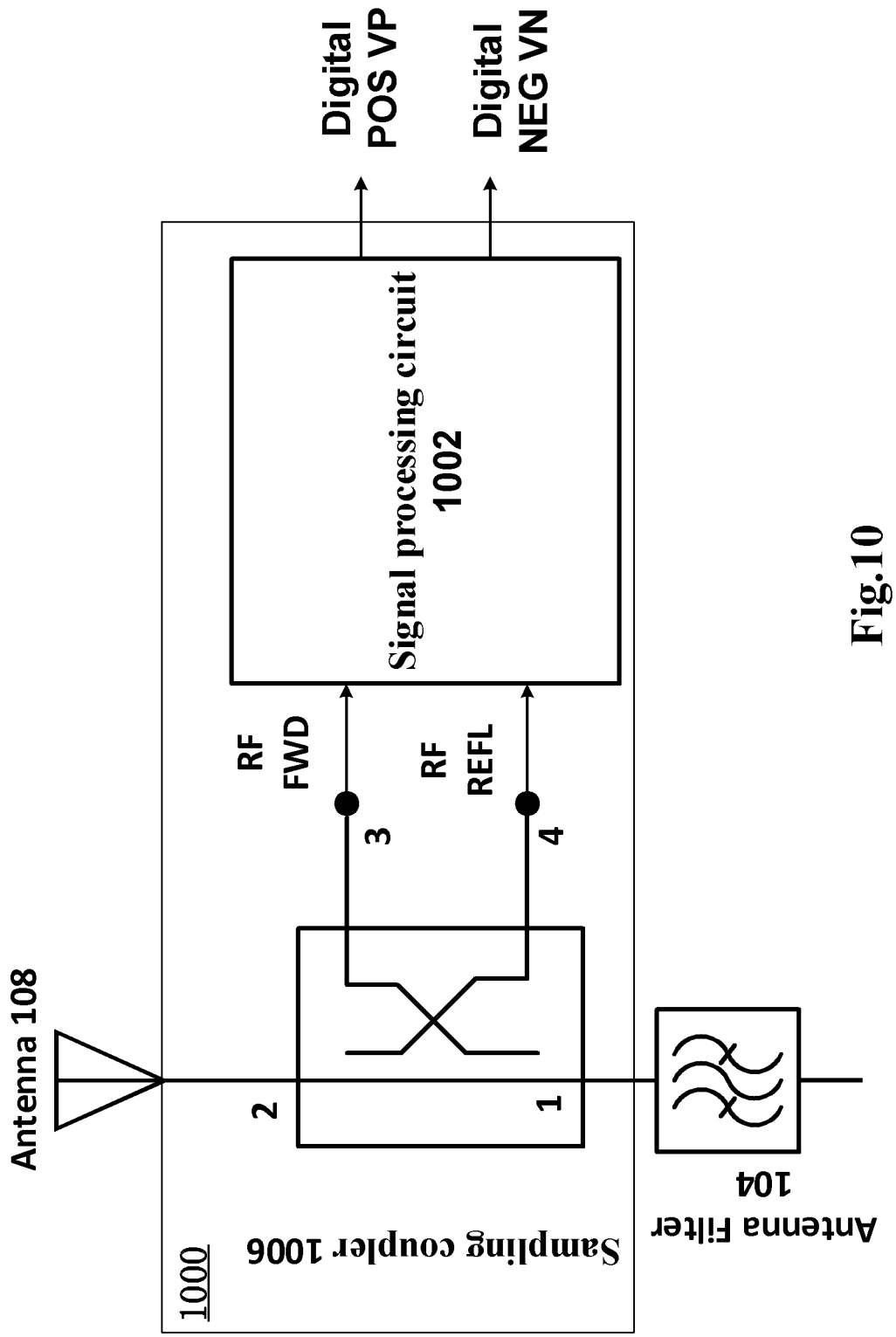
FIG. 10 is a schematic block diagram of a VSWR detection apparatus according to another embodiment of the disclosure.

FIG. 10 is a schematic block diagram of a VSWR detection apparatus 1000 according to another embodiment of the disclosure. As shown in FIG. 10, the VSWR detection apparatus 1000 may comprise a signal processing circuit 1002 with 1-bit ADC functionality and a sampling coupler 1006 connected with the signal processing circuitry 1002 and configured to obtain the forward coupled signal and the reverse coupled signal in the transmission line of the antenna system and output the forward coupled signal and the reverse coupled signal to the signal processing circuit 1002. The sampling coupler 1006 may comprise one of a directional coupler, a bridge, a circulator or any other suitable coupler. The functionality of the signal processing circuit 1002 is same as that of the signal processing circuit 102, 200 and 300 as shown in FIG. 1-3.

Figure 11:
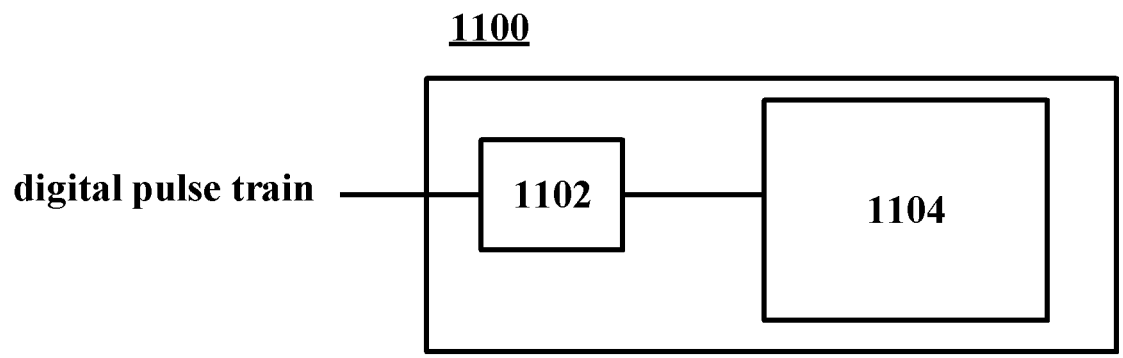
FIG. 11 is a schematic block diagram of a VSWR measure apparatus 1100 according to an embodiment of the disclosure.

FIG. 11 is a schematic block diagram of a VSWR measure apparatus according to an embodiment of the disclosure. The VSWR measure apparatus 1100 may comprise a digital interface 1102 for receiving a digital pulse train output by the VSWR detection apparatus as described above. In an embodiment, the digital interface comprises a GPIO.

The VSWR measure apparatus 1100 may further comprise a processing unit 1104 for counting a total number of the digital pulse train in a predefined timing window and perform, based on the total number of the digital pulse train, at least one of determining the VSWR, determining a state of the antenna system and triggering a standing wave condition alarm.

In an embodiment, the processing unit 1104 is configured to determine the VSWR based on the total number of the digital pulse train in the predefined timing window by using a VSWR output transfer function or a linear interpolation, wherein a corresponding relationship between a specific pulse number count and a specific VSWR has been learned. For example, the corresponding relationship between a specific pulse number count and a specific VSWR can be learned by experiments.

The output transfer function can be obtained by using curve fitting. In an embodiment, the VSWR output transfer function can be approximated by the following first order equation as $$VSWR=(PNC/2^{N}*ER_{VSWR})-\text{Offset}$$

Where PNC is a pulse number count, VSWR is a VSWR reading, $ER_{VSWR}$ is the effective range of VSWR, and Offset is an initial value of the function.

Figure 12:
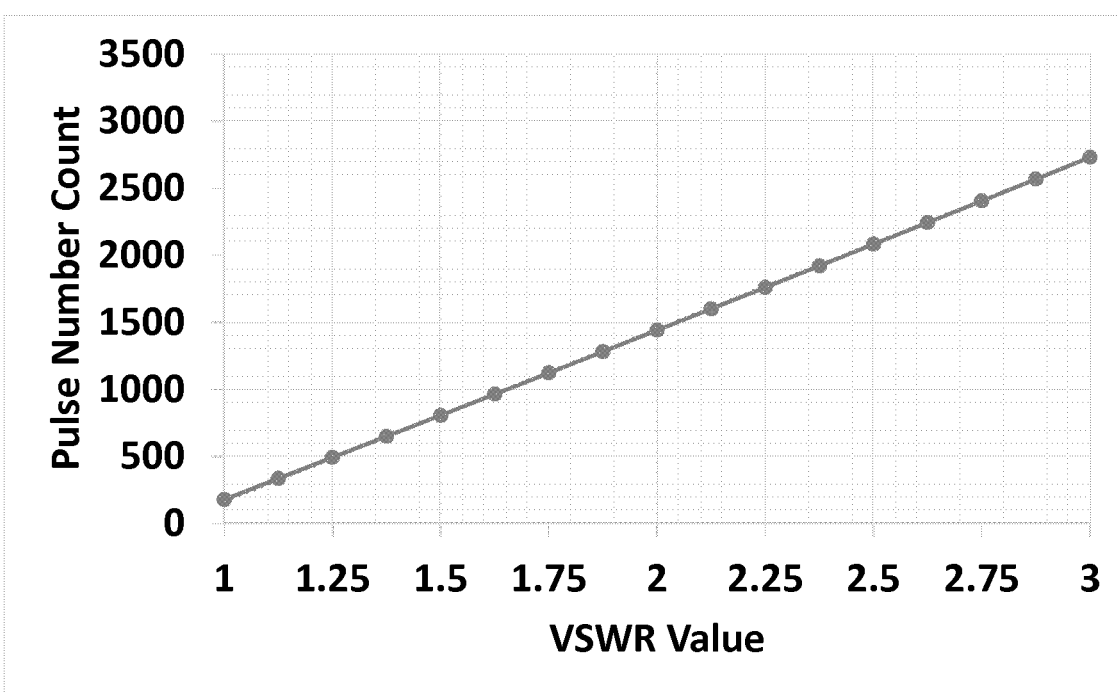
FIG. 12 shows a graph of the VSWR output transfer function according to an embodiment of the disclosure.

FIG. 12 shows a graph of the VSWR output transfer function according to an embodiment of the disclosure. As shown in FIG. 12, the VSWR output transfer function appears to be linear, but upon close inspection it can be seen that it truly is not linear as shown in FIG. 12. For more exact VSWR readings, the output pulse count can be converted to VSWR using linear interpolation of the values found in pulse number count to VSWR LUT as shown in Table 1.

Figure 13:
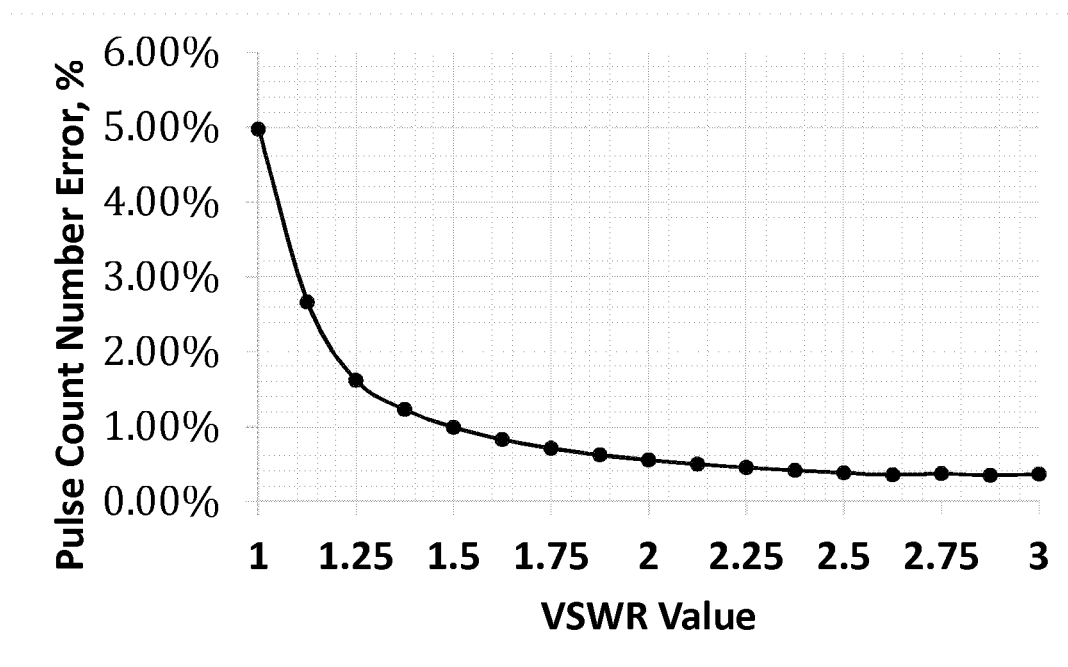
FIG. 13 shows a graph of accuracy using linear interpolation according to an embodiment of the disclosure.

FIG. 13 shows a graph of accuracy using linear interpolation of the values found in the LUT of pulse number count to VSWR as shown in Table 1. The curves in FIG. 12 and FIG. 13 show the accuracy of typical units when using the VSWR output transfer function and the linear interpolation. An improved performance when using the linear interpolation can clearly be seen.

Then the VSWR value may be displayed in the screen of the VSWR measure apparatus 1100 or transmitted to another device such as a transmission management unit. For example, the VSWR measure apparatus 1100 may transmit the VSWR value to the transmission management unit of the base station which may control the power from a base station transmitter or the like when there is a problem in the base station, infrastructure equipment or other problem.

In an embodiment, the processing unit 1104 may be further configured to compare the total number of the digital pulse train in the predefined timing window with a first threshold value and trigger a standing wave condition alarm when the total number of the digital pulse train is greater than the first threshold value. The threshold value may be set as a pulse number count corresponding to a specified VSWR value, such as 2.5 or other suitable value. In an embodiment, the pulse number count corresponding to the VSWR of 2.5 is set as the first threshold value. For example, when the pulse count exceeds the threshold pulse number, a red light alarm may be triggered. On the other hand, the green light indicates that the antenna system works fine. The first threshold value may be determined differently in other embodiments.

In an embodiment, the processing unit 1104 may be further configured to compare the total number of the digital pulse train in the predefined timing window with a plurality of second threshold values and determine the state of the antenna system based on the comparison result. For example, the antenna system is in good working condition when the VSWR is less than 1.5, and the antenna system can work normally when the VSWR is in a range of 1.5 to 2.5, and the antenna system's work condition is poor when the VSWR is greater than 2.5, which may be treated as a serious alarm. Noted that the second threshold values may be determined differently in other embodiments.

Figure 14:
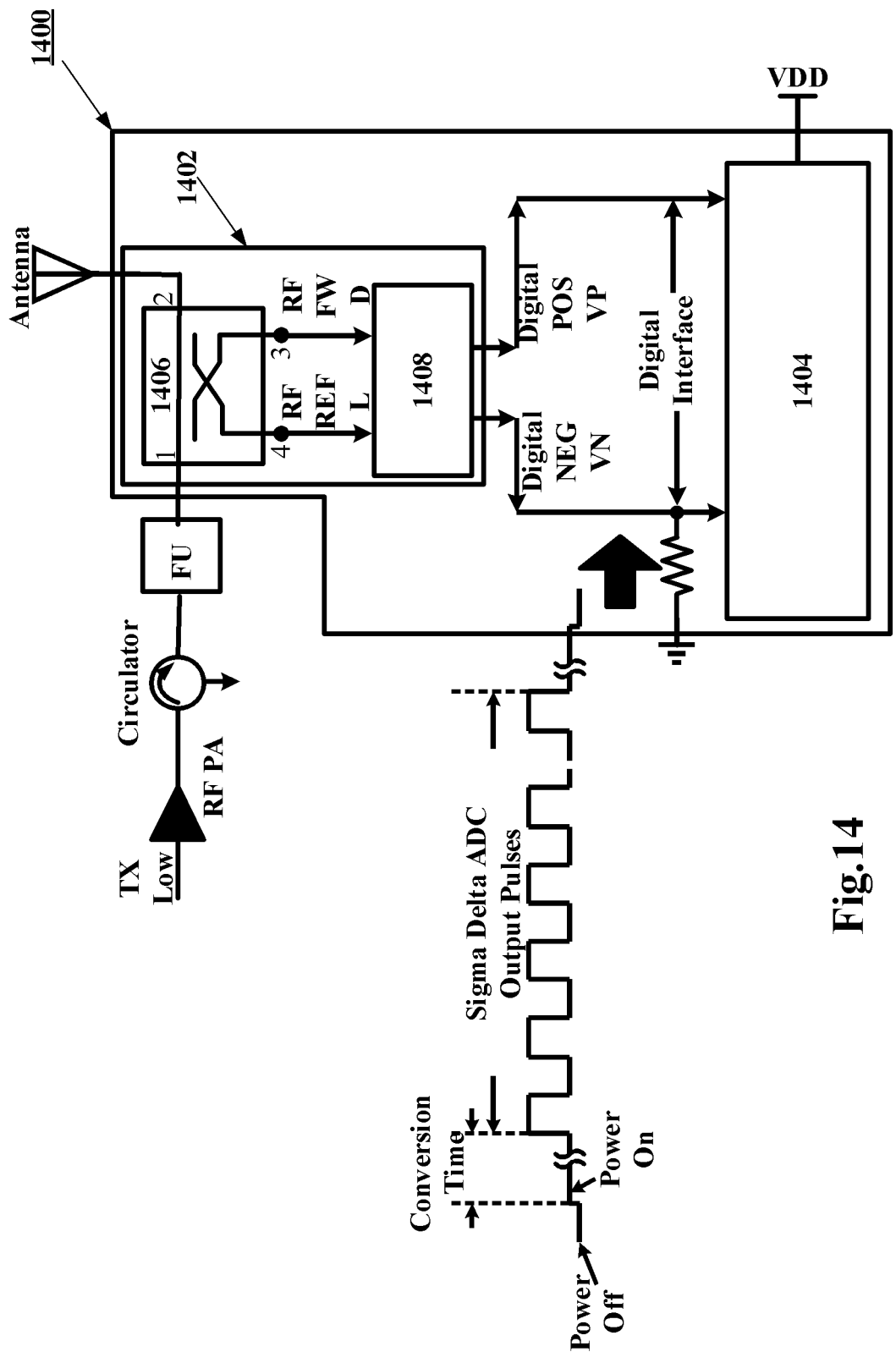
FIG. 14 schematically shows a VSWR determination apparatus according to an embodiment of the disclosure.

FIG. 14 schematically shows a VSWR determination apparatus according to an embodiment of the disclosure. As shown in FIG. 14, the VSWR determination apparatus 1400 may comprise at least one VSWR detection apparatus 1402 as described above and the VSWR measure apparatus 1404 as described above. The VSWR detection apparatus 1402 may comprise a signal processing circuit 1408 with 1-bit ADC functionality and a sampling coupler 1406.

Figure 15:
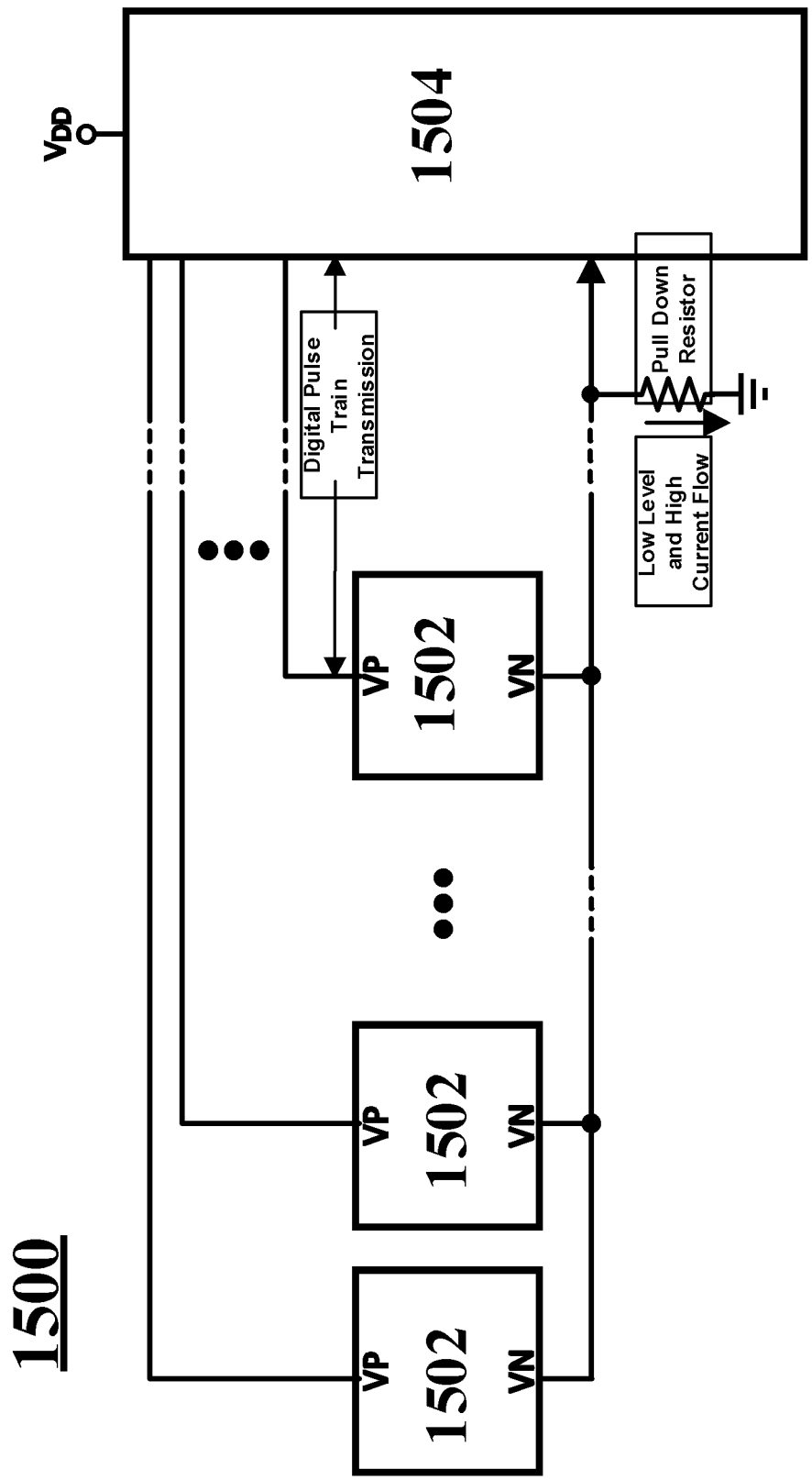
FIG. 15 schematically shows a VSWR determination apparatus according to another embodiment of the disclosure.

FIG. 15 schematically shows a VSWR determination apparatus according to another embodiment of the disclosure. In this embodiment, the VSWR determination apparatus 1500 may comprise multiple VSWR detection apparatus 1502 as described above and a VSWR measure apparatus 1504 as described above. This VSWR determination apparatus may be used for a multiple antenna connection scenario such as massive MIMO application scenario. In this embodiment, each VSWR detection apparatus 1502 only requires a two-wire digital transmission line to pass the digital pulse train to the VSWR measure apparatus 1504, which may simplify the circuitry design and reduce the system complexity.

In an embodiment, a radio device may comprise an antenna system and the VSWR determination apparatus as described above. The radio device may be the network device as described above or any other suitable device which can transmit a signal through the antenna system.

Figure 16:
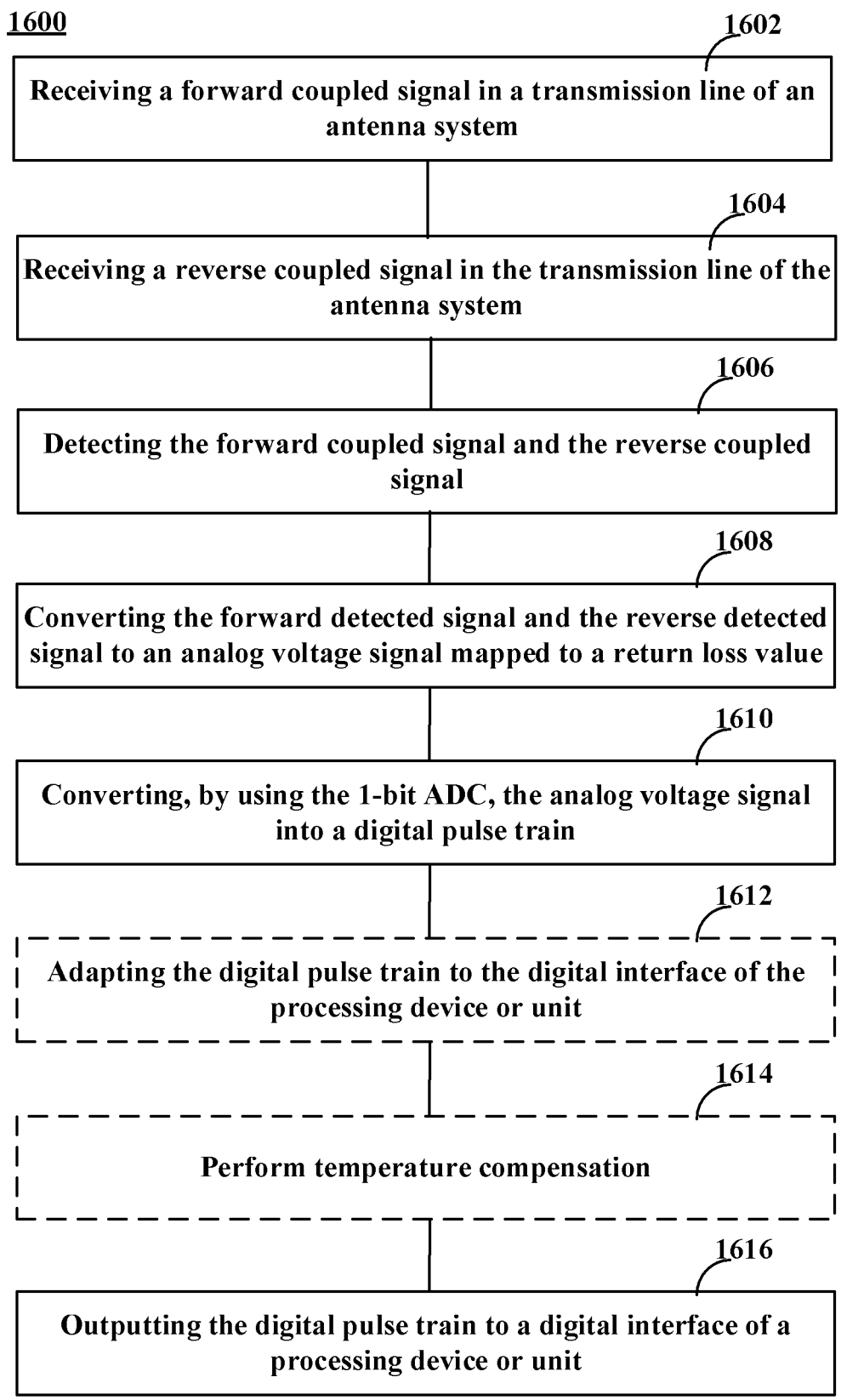
FIG. 16 is a flowchart illustrating a method implemented at a VSWR detection apparatus with 1-bit ADC functionality according to an embodiment of the disclosure.
Figure 17:
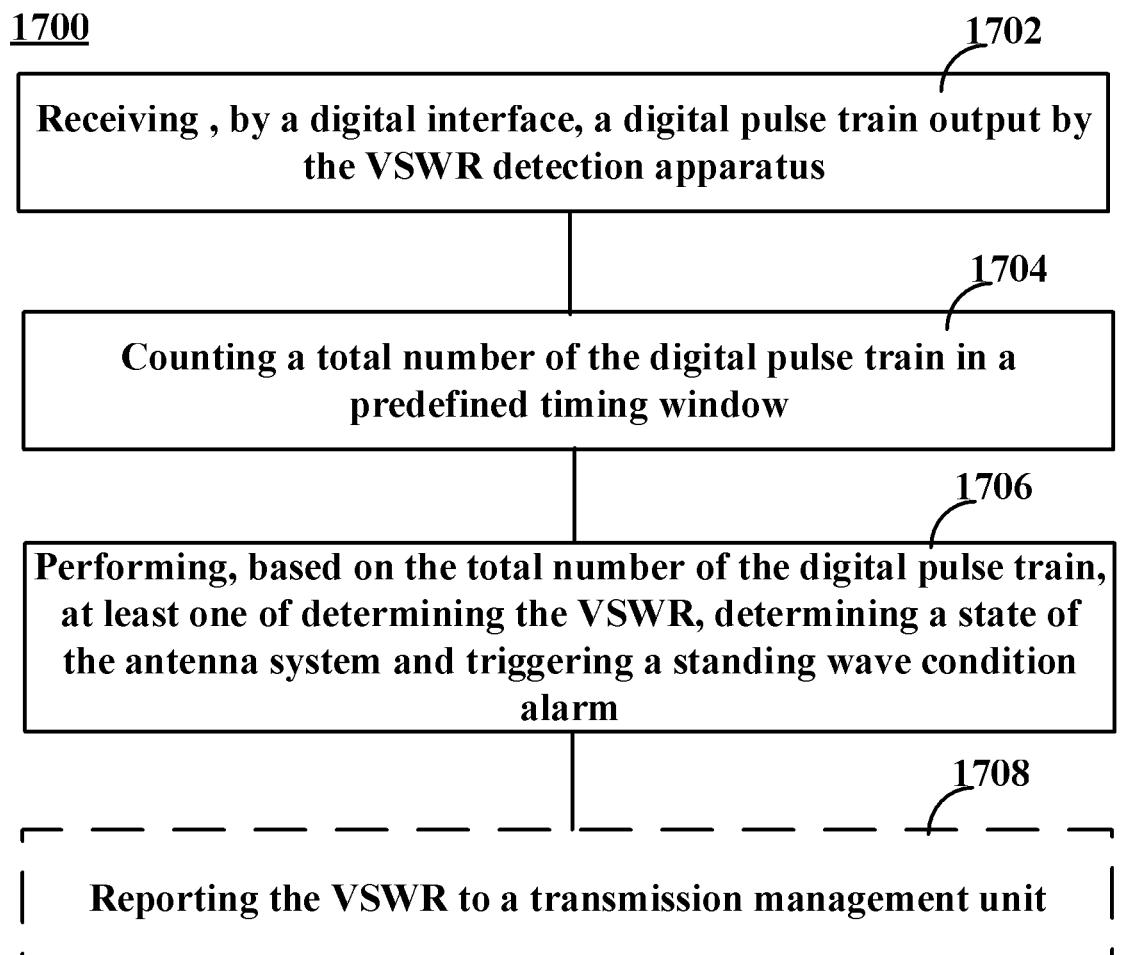
FIG. 17 is a flowchart illustrating a method implemented at a VSWR measure apparatus according to an embodiment of the disclosure.

Under the same inventive concept, FIGS. 16-17 are flow charts showing methods for VSWR according to some embodiments of the present disclosure. For same parts or functions as described in the previous embodiments, the description thereof is omitted for brevity.

FIG. 16 is a flowchart illustrating a method implemented at a VSWR detection apparatus with 1-bit ADC functionality according to an embodiment of the disclosure. The method 1600 can be performed by the VSWR detection apparatus as described in the previous embodiments.

At step 1602, the VSWR detection apparatus may receive a forward coupled signal in a transmission line of an antenna system. At step 1604, the VSWR detection apparatus may receive a reverse coupled signal in the transmission line of the antenna system. For example, the VSWR detection apparatus may receive the forward coupled signal and the reverse coupled signal from the sampling coupler.

At step 1606, the VSWR detection apparatus may detect the forward coupled signal and the reverse coupled signal. In an embodiment, the VSWR detection apparatus may detect the forward coupled signal by using a first radio frequency logarithmic detector and detect the reverse coupled signal by using a second radio frequency logarithmic detector, such as the RMS RF log detector.

At step 1608, the VSWR detection apparatus may convert the forward detected signal and the reverse detected signal to an analog voltage signal mapped to a return loss value. In an embodiment, the VSWR detection apparatus may convert the forward detected signal and the reverse detected signal to the analog voltage signal by using an operational amplifier.

At step 1610, the VSWR detection apparatus may convert, by using the 1-bit ADC, the analog voltage signal into a digital pulse train. In an embodiment, the 1-bit ADC comprises an 1-bit Sigma Delta ADC.

Optional, at step 1612, the VSWR detection apparatus may adapt the digital pulse train to a digital interface of a processing device or unit. In an embodiment, the VSWR detection apparatus may convert the digital pulse train to a train of current pulses changing from a first low current value to a second high current value and outputting the train of current pulses to the digital interface of the processing device or unit.

Optional, at step 1614, the VSWR detection apparatus may perform temperature compensation. For example, the VSWR detection apparatus may perform temperature compensation by using a temperature compensation circuit.

At step 1616, the VSWR detection apparatus may output the digital pulse train to the digital interface of the processing device or unit. In an embodiment, the digital interface comprises a General-Purpose Input-Output interface.

FIG. 17 is a flowchart illustrating a method implemented at a VSWR measure apparatus according to an embodiment of the disclosure. The 1700 can be performed by the VSWR measure apparatus as described in the previous embodiments.

At step 1702, the VSWR measure apparatus may receive, by a digital interface, a digital pulse train output by the VSWR detection apparatus as described above. In an embodiment, the digital interface comprises a General-Purpose Input-Output.

At step 1704, the VSWR measure apparatus may count a total number of the digital pulse train in a predefined timing window.

At step 1706, the VSWR measure apparatus may perform, based on the total number of the digital pulse train, at least one of determining the VSWR, determining a state of the antenna system and triggering a standing wave condition alarm.

In an embodiment, the VSWR measure apparatus may determine the VSWR based on the total number of the digital pulse train in the predefined timing window by using a VSWR output transfer function or a linear interpolation, wherein a corresponding relationship between a specific pulse number count and a specific VSWR has been learned.

In an embodiment, the VSWR measure apparatus may compare the total number of the digital pulse train in the predefined timing window with a first threshold value; and trigger a standing wave condition alarm when the total number of the digital pulse train is greater than the first threshold value. In an embodiment, a pulse number count corresponding to the VSWR of 2.5 is set as the first threshold value.

In an embodiment, the VSWR measure apparatus may compare the total number of the digital pulse train in the predefined timing window with a plurality of second threshold values; and determine the state of the antenna system based on the comparison result.

Optional, at step 1708, the VSWR measure apparatus may report the VSWR to a transmission management unit.

According to an aspect of the disclosure, it is provided a method implemented at a VSWR determination apparatus. The method may comprise the steps 1602, 1604, 1606, 1608, 1610, 1612, 1614, 1616, 1702, 1704, 1706 and 1708 as described in the previous embodiments.

In the present disclosure, one advantage of the embodiments is the digital pulse transmission over a long distance to the processing device or unit which may be CPU/MCU/FPGA/SOC/ASIC/PACC chipset or other suitable processing element. It brings about robustness and immunity to ambient noise and interference during transmission. Another advantage is low cost and simplified circuitry for example when the VSWR solution is used for the massive MIMO application scenario. For multiple antenna connections, each VSWR detection apparatus only requires a two-wire digital transmission line to pass the VSWR status to the processing device or unit, which simplify the circuitry design and reduce the system complexity.

In the embodiments of the present disclosure, due to the utilization of RF logarithmic detectors, the sensitivity metric may reach −70 dBm, +/− 3 dB dynamic range may reach 80 dB. The VSWR detection apparatus may provide great logarithmic intercept stability versus ambient temperature conditions. By using a precision biasing, a gain of the logarithmic detector is stabilized over temperature and supply variations. The overall DC (direct current) gain is high, due to the cascaded nature of the sub gain stages. Therefore, the stability over −40° C. to +85° C. temperature range may be ±0.5 dB. Additionally, with a low-cost temperature compensation scheme, the consistency of VSWR detection over temperature can be further guaranteed. This benefit can facilitate mass production and reduce efforts for calibration and get rid of complex digital temperature compensation schemes.

In addition, a compact and analog signal processing is completely deployed at RF front end. The embodiments of present disclosure get rid of using RF or IF signal transmission for VSWR indication, which may be interfered by noise and interference on the signal path. The embodiments of the present disclosure do not need complex base band digital signal processing e.g. FFT, The embodiments of the present disclosure can save hardware computing resources and power consumption at the base band processing. This may be more beneficial when multiple antennas are used, e.g. in the massive MIMO application scenario. The embodiments of the present disclosure do not use complex multi-bit ADC which may complex the design and reduce the robustness of VSWR detection. The embodiments of the present disclosure may use the Sigma Delta. ADC with 1-bit output which is simple, easy use and more robust for signal transmission. The embodiments of the present disclosure do not need down conversion components that are used from RF to IF. The solution of present disclosure is simple and low cost due to a couple of components used in the detection path. The embodiments of the present disclosure may use high precision analog temperature compensation to replace complex digital temperature compensation which may simplify calibration effort in mass production phase.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuit (as well as possibly firmware) for embodying at least one or more of a data processor, a digital signal processor and radio frequency circuit that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, FPGA, and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A voltage standing wave ratio (VSWR) detection apparatus, comprising:
    a signal processing circuit with 1-bit analog-to-digital converter (ADC) functionality configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital pulse train and output the digital pulse train to a digital interface of a processing device or unit.

2. The VSWR detection apparatus according to claim 1, wherein the signal processing circuit comprises:
    a first radio frequency logarithmic detector configured to detect the forward coupled signal; and
    a second radio frequency logarithmic detector configured to detect the reverse coupled signal.

3. The VSWR detection apparatus according to claim 1, wherein the signal processing circuit comprises:
    an operational amplifier configured to convert the forward detected signal and the reverse detected signal to the analog voltage signal.

4. The VSWR detection apparatus according to claim 1, wherein the 1-bit ADC comprises a 1-bit Sigma Delta ADC.

5. The VSWR detection apparatus according to claim 1, wherein the signal processing circuit comprises an interface and signal conditioning circuit configured to adapt the digital pulse train to the digital interface of the processing device or unit.

6. The VSWR detection apparatus according to claim 5, wherein the interface and signal conditioning circuit comprises a voltage controlled current source circuit configured to convert the digital pulse train to a train of current pulses changing from a first low current value to a second high current value and output the train of current pulses to the digital interface of the processing device or unit.

7. The VSWR detection apparatus according to claim 1, further comprising a temperature compensation circuit.

8. The VSWR detection apparatus according to claim 1, further comprising:
    a sampling coupler connected with the signal processing circuit and configured to obtain the forward coupled signal and the reverse coupled signal in the transmission line of the antenna system and output the forward coupled signal and the reverse coupled signal to the signal processing circuit.

9. The VSWR detection apparatus according to claim 8, wherein the sampling coupler comprises one of a directional coupler, a bridge and a circulator.

10. The VSWR detection apparatus according to claim 1, wherein the digital interface comprises a General-Purpose Input-Output interface.

11. A voltage standing wave ratio (VSWR) measure apparatus, comprising:
    a digital interface configured to receive a digital pulse train output by a VSWR detection apparatus comprising a signal processing circuit with 1-bit analog-to-digital converter (ADC) functionality configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital guise train and output the digital pulse train to a digital interface of a processing device or unit; and
    a processing unit configured to count a total number of the digital pulse train in a predefined timing window and perform, based on the total number of the digital pulse train, at least one of determining the VSWR, determining a state of the antenna system and triggering a standing wave condition alarm.

12. The VSWR measure apparatus according to claim 11, wherein the processing unit is configured to determine the VSWR based on the total number of the digital pulse train in the predefined timing window by using a VSWR output transfer function or a linear interpolation, wherein a corresponding relationship between a specific pulse number count and a specific VSWR has been learned.

13. The VSWR measure apparatus according to claim 11, wherein the processing unit is configured to compare the total number of the digital pulse train in the predefined timing window with a first threshold value and trigger a standing wave condition alarm when the total number of the digital pulse train is greater than the first threshold value.

14. The VSWR measure apparatus according to claim 11, wherein a pulse number count corresponding to the VSWR of 2.5 is set as the first threshold value.

15. The VSWR measure apparatus according to claim 11, wherein the processing unit is further configured to compare the total number of the digital pulse train in the predefined timing window with a plurality of second threshold values and determine the state of the antenna system based on the comparison result.

16. The VSWR measure apparatus according to claim 11, wherein the digital interface comprises a General-Purpose Input-Output.

17. The VSWR measure apparatus according to claim 11, wherein the processing unit is configured to report the VSWR to a transmission management unit.

18. A method implemented at a voltage standing wave ratio (VSWR) detection apparatus with 1-bit analog-to-digital converter (ADC) functionality, comprising:
    receiving a forward coupled signal in a transmission line of an antenna system;
    receiving a reverse coupled signal in the transmission line of the antenna system;

detecting the forward coupled signal and the reverse coupled signal;
converting the forward detected signal and the reverse detected signal to an analog voltage signal mapped to a return loss value;
converting by the 1-bit ADC the analog voltage signal into a digital pulse train; and
outputting the digital pulse train to a digital interface of a processing device or unit.

19. A method implemented at a voltage standing wave ratio (VSWR) measure apparatus, comprising:
receiving by a digital interface a digital pulse train output by a VSWR detection apparatus comprising a signal processing circuit with 1-bit analog-to-digital converter (ADC) functionality configured to receive a forward coupled signal in a transmission line of an antenna system, receive a reverse coupled signal in the transmission line of the antenna system, detect the forward coupled signal and the reverse coupled signal, convert the forward detected signal and the reverse detected signal to an analog voltage signal mapped to a return loss value, convert by the 1-bit ADC the analog voltage signal into a digital pulse train and output the digital pulse train to a digital interface of a processing device or unit;
counting a total number of the digital pulse train in a predefined timing window; and
performing, based on the total number of the digital pulse train, at least one of determining the VSWR, determining a state of the antenna system and triggering a standing wave condition alarm.

20. A computer program product comprising a non-transitory computer readable medium storing a computer program comprising instructions which, when executed by at least one processor, cause the at least one processor to perform the method according to claim 19.

* * * * *